United States Patent [19]

Lundquist et al.

[11] 3,959,145

[45] May 25, 1976

[54] MAGNETIC SEPARATOR WITH SCRAPER MEANS

[75] Inventors: Bertil Lundquist, Vasteras; Harald Nilsson, Helsingborg; Jorgen Zinck-Petersen, Vasteras, all of Sweden

[73] Assignee: Allmanna Svenska Elektriska Aktiebolaget, Vasteras, Sweden

[22] Filed: Feb. 8, 1974

[21] Appl. No.: 440,872

[30] Foreign Application Priority Data

Mar. 26, 1973 Sweden .............................. 7304194

[52] U.S. Cl. .............................. 210/223; 209/222; 209/229

[51] Int. Cl.[2] .............................. B01D 35/06

[58] Field of Search ........... 209/222, 232, 228, 229; 210/222, 223, 223 R

[56] References Cited

UNITED STATES PATENTS

| | | | |
|---|---|---|---|
| 9,610 | 3/1853 | Gardiner | 209/229 X |
| 405,045 | 6/1889 | Mowrer | 209/229 |
| 786,946 | 4/1905 | Bennett | 209/229 X |
| 2,094,615 | 10/1937 | Parker | 209/232 X |
| 2,295,190 | 9/1942 | Zenge | 209/324 X |
| 2,459,343 | 1/1949 | Scrivener | 210/222 |
| 2,983,380 | 5/1961 | Davenhauer | 209/324 X |
| 3,062,376 | 11/1962 | Davis | 210/222 |
| 3,168,464 | 2/1965 | Ferris | 209/223 R |
| 3,349,918 | 10/1967 | Ike | 210/223 |

FOREIGN PATENTS OR APPLICATIONS

| | | | |
|---|---|---|---|
| 151,969 | 7/1961 | U.S.S.R. | 209/222 |
| 242,797 | 9/1969 | U.S.S.R. | 209/222 |
| 570,355 | 7/1945 | United Kingdom | 209/232 |

*Primary Examiner*—Robert Halper

[57] ABSTRACT

A magnetic separator for removing contaminations from a liquid to which a ferromagnetic particulate material has been added is formed of a plurality of discs arranged along a shaft parallel to each other with spaces therebetween, the bottom parts of which dip into a container for the liquid. The discs contain permanent magnets of substantial coercive field strength over at least the greater part of their areas. The ferromagnetic material and contaminants carried thereby are scraped off the surface of the discs by belts which surround the shaft and which extend outside the discs to discharge the material scraped off of the discs.

8 Claims, 5 Drawing Figures

MAGNETIC SEPARATOR WITH SCRAPER MEANS

BACKGROUND OF THE INVENTION

1. Field of the Invention

The invention relates to a magnetic separator particularly for the removal of ferromagnetic particulate material loaded with contaminants.

2. The Prior Art

It is well-known that liquids contaminated with suspended particles or dissolved high-molecular substances, such as resinous substances, can be cleaned by adding a ferromagnetic particulate material, such as magnetite, iron, cobalt or nickel, to the liquid and separating the contaminant together with the ferromagnetic material in a magnetic field. It is also known to clean liquids in a similar way, which liquids from the start contain contaminants of ferromagnetic particulate materials, for example departing coolant from machines for mechanical machining, such as lathes and drills. Also contaminated gases can be cleaned in principle by the addition of a ferromagnetic particulate material and treatment in a magnetic field for separation of the contaminants. It is also known to use chemical flocking agents simultaneously in the cleaning process, for example lime, alum, iron chloride, polyelectrolytes and water glass.

In the described cleaning operations a magnetic separator is used. One known embodiment of such a separator consists of a rotatable cylindrical drum which is lowered down into a trough which is concentric with the drum, so that a gap is formed between the envelope surface of the drum and the trough. A plurality of permanent magnets are arranged in longitudinal rows on the inside of the envelope surface of the drum, and the medium to be cleaned is lead through said while at the same time the drum is rotated. The separator is also provided with a scraper for removing the material which adheres to the drum during the separation so that the process is continuous. The magnets can either rotate with the drum or be stationary during the rotation of the drum.

Another known embodiment of a magnetic separator is formed with a gap between two plane parallel rigid walls, one of which contains a plurality of horseshoe magnets built into it and located adjacent to and spaced from each other.

Proposals have also been made to provide magnetic separators, the walls of which consist of ferromagnetic material and are attached, radially directed, along a rotatable shaft, the separator being provided with a stationary magnet with the ability to generate a magnetic field, substantially parallel with the rotatable shaft, with local gradients. To achieve a practical embodiment of such a separator, space-demanding and very expensive magnetization devices are required, such as an iron circuit and a magnetization coil. The scraper means may be of a finger-like type.

SUMMARY OF THE INVENTION

According to the present invention there is provided a magnetic separator with an extremely large separating surface without the use of space-demanding and expensive magnetization devices and with a very efficient scraping during operation. In this way an extremely compact separator is achieved. This result is obtained by designing the separator as a disc filter, in the filter discs of which permanent magnets are arranged in such a way that local field inhomogeneities occur in the gaps between the discs, and by giving the scraper means the form of endless transport belts which enter into the gaps.

The present invention relates more particularly to a magnetic separator comprising a number of substantially parallel filter discs which are attached, radially directed, along a rotatable shaft with gaps between the discs for passage of a medium which is to be cleaned, said medium when entering the separator containing a ferromagnetic particulate material, local field inhomogeneities being generated in the gaps between the discs and the separator being provided with a scraper means for the particulate material which adheres to the discs when the medium passes the gaps, characterised in that the discs contain permanent magnets and that the scraper means comprises a plurality of endless transport belts which enter the gaps and extend outside the discs.

The discs in the separator according to the invention are normally formed with smooth outer walls between which the permanent magnets are positioned. The walls then consist of a non-magnetic material, for example stainless steel-sheet, aluminium or resin, for example an epoxy resin into which the permanent magnets are then suitably cast.

Because the scraper means comprises a plurality of endless transport belts which enter the gaps and extend outside the discs, removal of contaminations is achieved with the same means with which the scraping is carried out. In this way separate means for the removal are not necessary, which reduces the space requirement for the separator. The continuous removal of contaminations also causes the scraping as such to become more efficient by the fact that agglomeration of contaminations in the separator is avoided. The transport belts can be arranged to surround and be driven by the shaft of the separator. However, they can also be driven by a drive means located outside the discs, for example with a motor-driven roll. In this latter case the separator can be driven by the transport belts if these surround the separator shaft. The use of the same drive means for the separator shaft and for the transport belts contributes to make the separator compact. The transport belts consist of belts of, for example, stainless steel, rubber or resin.

According to an embodiment of the invention the permanent magnets are in the form of discrete magnets arranged to extend between supporting walls of the discs, said walls facing the gaps. The magnets then should have great coercive field strength in order that they may be made short and the separator thus compact. Particularly preferred are ceramic magnets such as barium or strontium ferrite, which have a coercive field strength exceeding 100 kA/m, but in principle it is also possible to use metallic magnets with great coercive field strength, such as samarium-cobalt magnets. It is particularly favourable to use anisotropic magnets, since these have greater coercive field strength than the corresponding isotropic magnets, for barium and strontium ferrite, for example, a coercive field strength of more than 200 kA/m.

In order to make the filter surface as large as possible it is suitable to arrange the permanent magnets along substantially the whole extension of the discs. To facilitate the scraping off it may be advantageous, however, to omit the magnets within limited, preferably sector-shaped areas, for agglomerated particulate material can be detached more easily from the discs if they are provided with distinct areas without magnets.

BRIEF DESCRIPTION OF THE DRAWINGS

The invention will be explained more fully by the description of embodiments with reference to the accompanying drawings, which FIG. 1 schematically shows a separator according to the invention, perpendicular to the direction of flow of the medium and without scraper means being shown, FIG. 2 the same separator in the direction of flow of the medium, FIG. 3 schematically a disc consisting of two walls and discrete magnets arranged between them, in the direction of flow of the medium, FIG. 4 a cross-section of the disc according to FIG. 3, and FIG. 5 the area A in the disc according to FIG. 3.

DESCRIPTION OF THE PREFERRED EMBODIMENT

Figure 1:
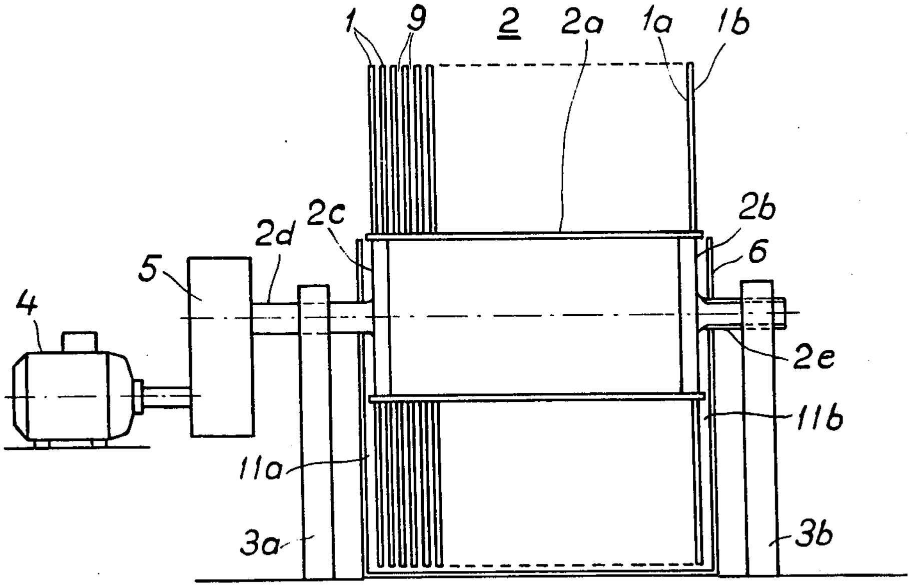
Figure 2:
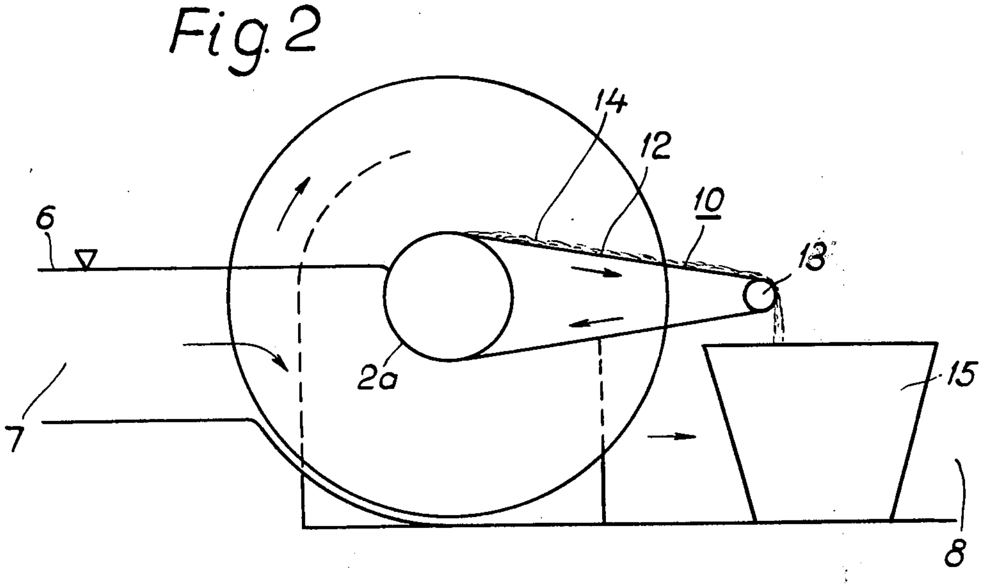
Figure 4:
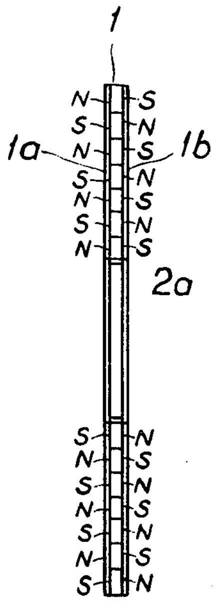
Figure 5:
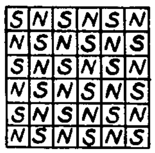

The magnetic separator according to FIGS. 1 and 2 consists of a plurality of discs 1, each one consisting of two parallel walls 1*a* and 1*b* between which permanent magnets are arranged, as will be explained more fully in connection with the description of FIGS. 3 – 5. The discs and the walls, respectively, are arranged parallel with each other along the shaft 2 of the separator and radially directed. The separator shaft comprises in the exemplified case a central, wider part 2*a*, flanges 2*b* and 2*c* and shaft ends 2*d* and 2*e* which are journalled in supports 3*a* and 3*b*. The shaft is driven by a motor 4 through a gear 5. The unit, consisting of discs mounted on the shaft 2, is arranged in a tank 6 for the medium to be cleaned. The tank inlet is designated 7 and its outlet 8. When passing the separator the medium is conveyed through the gaps 9 between the discs 1. In that process ferromagnetic particles with substances, which are to be separated, attached to them adhere to the walls of the filter discs and accompany the walls during the rotation, which is preferably performed against the direction of flow of the medium. The separator is provided with a scraper means 10 consisting of endless transport belts, arranged in each gap 9 between the discs and in the gaps 11*a* and 11*b* outside the outermost walls. In the exemplified case each transport belt consists of a belt 12 of stainless steel or of rubber, which surrounds and is driven by the central part 2*a* of the separator shaft, and which surrounds a roll 13 located outside the discs. When the discs rotate the picked-up material is scraped off when passing the belt 12. The belt does not have to run close to the discs, but there can be a slight clearance to reduce the wear. The material 14 scraped off by the belt is transported by the belt to a collecting container 15. It is possible to have a simple scraper arranged at the roll 13 to prevent scraped-off material from being returned to the separator. As is clear from FIGS. 3 – 5 each disc 1 consists of two walls 1a and 1b, for example of stainless steel having a thickness of 0.5 mm, which at their periphery are folded over and tightened against each other. Between the walls magnets of barium ferrite are closely packed, as is clear from FIGS. 4 and 5. They are also fixed to the walls, for example by an epoxy resin glue. The magnets may, for example, have a length in the magnetizing direction of 5 – 10 mm and an area of 1 – 5 $cm^2$ perpendicular to the magnetizing direction. Two adjacent magnets within the same disc have different polarities in the example shown. In this way a maximum field gradient is formed. In order to strengthen the field gradients, two adjacent discs on the separating shaft should have reversed pole configurations.

Figure 3:
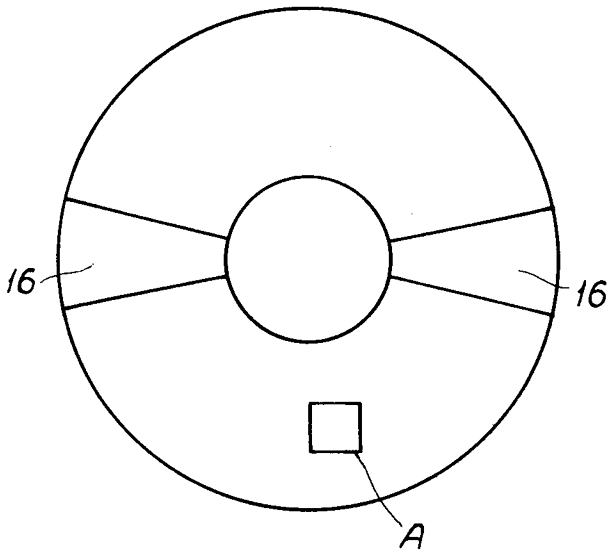

From FIG. 3 it is clear that the discs may have areas 16, preferably sector-shaped, without magnets in order to facilitate the scraping.

In the cases exemplified in the figures, the magnets rotate with the rotation of the discs. However, it is also possible to arrange the magnets stationary with only the walls rotating.

We claim:

1. Magnetic separator comprising a rotatable shaft, a plurality of substantially parallel filter discs which are attached along said shaft and located in planes substantially perpendicular thereto with with gaps between the discs for passage of medium which is to be cleaned, said medium when entering the separator containing a ferromagnetic particulate material, said discs containing permanent magnets producing local magnetic field inhomogeneities in the gaps between the discs and the separator being provided with a scraper means for the particulate material which adheres to the discs when the medium passes the gaps, wherein the scraper means comprises a plurality of endless transport belts which enter the gaps between the discs and extend outside the discs, said separator having means to drive the shaft of the separator and the belts, said transport belts surrounding the separator shaft and having upper and lower runs, said upper runs moving outwardly with respect to the discs.

2. Magnetic separator according to claim 1, wherein the drive means is connected to the separator shaft and said transport belts are driven by the shaft.

3. Magnetic separator according to claim 1, in which the discs each comprise spaced walls, and the permanent magnets extend between the walls of the discs, said walls facing the gaps.

4. Magnetic separator according to claim 3, in which the permanent magnets are packed closely to each other between the walls of the discs and in which the adjacent magnets are of opposite polarities.

5. Magnetic separator according to claim 4, in which the permanent magnets are ceramic magnets.

6. Magnetic separator according to claim 1, in which the permanent magnets have a coercive field strength exceeding 100 kA/m.

7. Magnetic separator according to claim 1, in which the permanent magnets are arranged along substantially the whole extension of the discs, with the exception of limited areas for facilitating scraping off the particulate material which adheres to the discs.

8. Magnetic separator according to claim 1, in which the permanent magnets are arranged along substantially the whole extension of the discs.

* * * * *